US012368369B2

(12) United States Patent
Moon et al.

(10) Patent No.: US 12,368,369 B2
(45) Date of Patent: Jul. 22, 2025

(54) LLC RESONANT CONVERTER WITH HIGH RELIABILITY

(71) Applicant: Korea Advanced Institute of Science and Technology, Daejeon (KR)

(72) Inventors: GunWoo Moon, Daejeon (KR); Taewoo Kim, Daejeon (KR); Seunghyun Choi, Daejeon (KR); Dongmin Choi, Daejeon (KR); Jong Yoon Chae, Daejeon (KR); Jeongchan Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 173 days.

(21) Appl. No.: 18/074,495

(22) Filed: Dec. 4, 2022

(65) Prior Publication Data

US 2023/0268821 A1    Aug. 24, 2023

(30) Foreign Application Priority Data

Feb. 18, 2022 (KR) .................. 10-2022-0021461
Nov. 8, 2022 (KR) .................. 10-2022-0147695

(51) Int. Cl.
*H02M 1/36* (2007.01)
*H02M 1/00* (2006.01)
*H02M 3/335* (2006.01)

(52) U.S. Cl.
CPC ........... *H02M 1/0058* (2021.05); *H02M 1/36* (2013.01); *H02M 3/33571* (2021.05)

(58) Field of Classification Search
CPC ............. H02M 1/0058; H02M 1/0048; H02M 1/0054; H02M 1/36; H02M 1/38; H02M 1/40; H02M 1/32; H02M 3/33571; H02M 3/33573; H02M 3/33576; H02M 3/33584; H02M 3/33592; H02M 3/3372
See application file for complete search history.

(56) References Cited

U.S. PATENT DOCUMENTS

| | | | |
|---|---|---|---|
| 6,574,125 B2* | 6/2003 | Matsukawa | H02M 3/33584 363/71 |
| 9,692,305 B2* | 6/2017 | Yan | H02M 3/285 |
| 2011/0007527 A1* | 1/2011 | Liu | H02M 3/33561 363/21.02 |
| 2012/0262955 A1* | 10/2012 | Yan | H02M 3/3376 363/21.02 |

* cited by examiner

*Primary Examiner* — Nguyen Tran
(74) *Attorney, Agent, or Firm* — CHRISTENSEN O'CONNOR JOHNSON KINDNESS PLLC

(57) ABSTRACT

It is provided a novel LLC resonant converter with high reliability and the operation method thereof. The LLC resonant converter proposed in the present invention includes an original converter including a primary side circuit on which two half-bridge cells are connected in parallel and a secondary side circuit on which two half-bridge cells are connected in series and a redundant converter having the same configuration with the original converter, and connected with the original converter at a midpoint of a secondary winding.

14 Claims, 18 Drawing Sheets

(a)

(b)

(a)

(b)

LLC RESONANT CONVERTER WITH HIGH RELIABILITY

This application claims the priority benefit of Korean Patent Application No. 10-2022-0021461, filed on Feb. 18, 2022, and Korean Patent Application No. 10-2022-0147695, filed on Nov. 8, 2022 in the Korean Intellectual Property Office, the disclosure of which is incorporated herein by reference.

BACKGROUND

1. Field of the Invention

The present invention relates to a novel LLC resonant converter with high reliability.

2. Description of Related Art

With increasing concern about global warming and air pollution, the government and industry have worked together to reduce carbon dioxide ($CO_2$) emissions. Accordingly, E-mobility (electro-mobility) has been in the spotlight due to the low $CO_2$ emissions, and it is widely employed in the transportation industry.

In E-mobility applications, such as MEA (More Electric Aircraft), MES (More Electric Ship), EV (Electric Vehicle), and electric propulsion spacecraft, they can cause catastrophic casualties to human lives and properties when electrical power systems fail. Therefore, the reliability of E-mobility is the most significant concern, and proper remedial action must be taken in the event of a failure.

According to the prior art, a switch is one of the most vulnerable components in a converter, and a significant number of its failures are caused by SCFs (Short-Circuit Faults). To achieve high reliability, it is necessary to isolate a faulty switch and reconstruct the converter to maintain a stable output voltage. Using these fault-tolerant strategies, the converter can operate normally during unexpected SCFs, instead of system failure.

Many studies have been proposed to solve the reliability issues. They are classified as additional switch, redundant converter, and reconfiguration. In the prior art, one switch and TRIAC are added in parallel with an original switch. When the SCF occurs in the original switch, the converter regulates the output voltage through the additional switch. In the prior art, one switch and fuse are added to a buck converter. These methods utilize an additional switch to transform the buck converter into the buck-boost converter after a switch failure. As a result, the aforementioned studies can achieve a single fault-tolerant capability through the additional switch. However, they require a TRIAC or fuse to isolate a faulty switch.

A redundant converter is widely used due to its multiple fault-tolerant capabilities. It can achieve a modularity of 'n+k' redundancy, where n represents the active converters required to transfer power from the input to the output, and k represents the redundant converters for providing fault-tolerant capabilities. Also, according to the requirements of the applications, the redundant converter can be divided into cold and hot redundancies. In cold redundancy, redundant converters are inactive during normal operation. When faults occur, the redundant converters are switched on to replace the failed converters. In hot redundancy, all converters are always active. Even if one of them fails, the remaining redundant converters continue to operate. As a result, the aforementioned studies can achieve multiple fault-tolerant capabilities through redundant converters. However, there is a trade-off with the number of redundant converters. The more redundant converters are used for high reliability, the worse the power density and cost.

FIG. 1 is a drawing for describing double fault-tolerant capabilities according to the prior art.

In the case of the '1+2' redundant converters shown in FIG. 1, the overall power density and cost are degraded three times because of the two redundant converters.

To overcome these drawbacks of redundant converters, a reconfiguration is proposed in full-bridge converters. When the SCF occurs in one switch of the full-bridge cell, it is reconfigured into the half-bridge cell by turning off the complementary switch on the faulty leg. That is, the reconfiguration utilizes a half-bridge cell with healthy switches instead of a redundant converter. In the prior art, a boost cell is added as a post-regulator in the phase-shifted full-bridge converter. When the SCF occurs in the switch, the full-bridge cell is reconfigured into the half-bridge cell, and the boost unit regulates the output voltage. In the prior art, a floating switch and voltage doubler cell are added to the LLC converter. The converter of the prior art utilizes a voltage doubler cell to maintain a stable output voltage. In the prior art, a half-bridge cell and relays are added to the LLC converter. They are used to reconfigure the full-bridge cell to output-series dual half-bridge cells. Thus, the output voltage is still regulated. The aforementioned prior art can achieve a single fault-tolerant capability through the use of only one converter. However, they cannot satisfy the high-reliability requirement of E-mobility. To satisfy the high-reliability requirements, an LLC converter with double fault-tolerant capabilities has been proposed in the prior art. It withstands double SCFs by adding two diodes on the secondary side. With a reconfiguration and two diodes, one redundant converter can be removed. As a result, the prior art can achieve high power density and low cost by reconfiguration. However, they require additional components and only can be used with cold redundancy. Moreover, the equivalent circuit of the converters changes after a fault occurs. It causes a lower voltage gain and a worse operating frequency range under fault conditions. Consequently, the prior art degrades the efficiency and dynamics of the converter.

SUMMARY

The technical problem to be achieved by the present invention is to provide a novel LLC resonant converter with high reliability for greatly reducing volume and cost of a system without changing operation and characteristics of the existing converter by responding to multiple-fault with a small number of converters.

According to one aspect of at least one embodiment, a LLC resonant converter proposed in the present invention includes an original converter including a primary side circuit on which two half-bridge cells are connected in parallel and a secondary side circuit on which two half-bridge cells are connected in series, and a redundant converter having the same configuration with the original converter, and connected with the original converter at a midpoint of a secondary wingding.

The primary side circuit of the original converter according to embodiments of the present invention includes a first half-bridge cell including two switches $Q_1$ and $Q_2$ and a second half-bridge cell including two switches $Q_3$ and $Q_4$, and a primary side circuit of the redundant converter includes a first half-bridge cell including two switches $Q_5$ and $Q_6$ and a second half-bridge cell including two switches $Q_7$ and $Q_8$.

From the primary side circuit of the original converter according to embodiments of the present invention, the two switches $Q_1$ and $Q_2$ have complementary duty cycles, and the two switches $Q_3$ and $Q_4$ have complementary duty cycles.

From the primary side circuit of the redundant converter according to embodiments of the present invention, the two switches $Q_5$ and $Q_6$ have complementary duty cycles, the two switches $Q_7$ and $Q_8$ have complementary duty cycles, and PFM (Pulse Frequency Modulation) control is used to regulate output voltage.

When the plurality of switches $Q_1$ to $Q_4$ of the original converter according to embodiments of the present invention operate normally (Mode 1), the original converter controls output voltage, and the redundant converter remains inactive.

When operating in Mode 1 according to embodiments of the present invention, current of the original converter does not flow through the secondary winding of the redundant converter interconnected with the original converter, and the plurality of switches $Q_1$ to $Q_4$ of the original converter and a plurality of diodes $D_1$ to $D_4$ of the secondary side circuit of the original converter achieve a ZVS (Zero Voltage Switching).

When a single-fault occurs in one of the plurality of switches $Q_1$ to $Q_4$ of the original converter (Mode 2) according to embodiments of the present invention, the redundant converter is used to control output voltage.

When operating in Mode 2 according to embodiments of the present invention, gate drive signals of the plurality of switches $Q_1$ to $Q_4$ of the original converter are disabled, and the redundant converter operates.

When operating in Mode 2 according to embodiments of the present invention, current of the redundant converter does not flow through the secondary winding of the original converter interconnected with the redundant converter, and the plurality of switches $Q_5$ to $Q_8$ of the redundant converter and a plurality of diodes $D_5$ to $D_8$ of the secondary side circuit of the redundant converter achieve a ZVS (Zero Voltage Switching).

When a double-fault in which a fault occurs in one of the plurality of switches $Q_1$ to $Q_4$ of the original converter, and at the same time a fault occurs in one of the plurality of switches $Q_5$ to $Q_8$ of the redundant converter occurs (Mode 3) according to embodiments of the present invention, the converter is reconfigured by utilizing half-bridge cell which is normally operated among half-bridge cells of the original converter and the redundant converter.

When operating in Mode 3 according to embodiments of the present invention, the converter is reconfigured by utilizing combination of half-bridge cells which are normally operated among first half-bridge cell and second half-bridge cell of the primary side circuit of the original converter, first half-bridge cell and second half-bridge cell of the primary side circuit of the redundant converter.

According to embodiments of the present invention, the LLC resonant converter controls output voltage by transferring voltage to corresponding transformer of the secondary side circuit of the original converter and the secondary side circuit of the redundant converter through a primary side transformer operating in the converter which is reconfigured with the combination of half-bridge cells which are normally operated.

According to another aspect of at least one embodiment, an operation method of a LLC resonant converter proposed in the present invention including an original converter including a primary side circuit on which two half-bridge cells are connected in parallel and a secondary side circuit on which two half-bridge cells are connected in series and a redundant converter having the same configuration with the original converter, and connected with the original converter at the midpoint of a secondary wingding comprises controlling output voltage by using the redundant converter when a single-fault occurs in one of a plurality of switches $Q_1$ to $Q_4$ of the original converter, and reconfiguring a converter by utilizing half-bridge cell which is normally operated among half-bridge cells of the original converter and the redundant converter when a double-fault that after the single-fault, a fault occurs in one of a plurality of switches $Q_5$ to $Q_8$ occurs.

Volume and cost of a system may be greatly reduced without changing operation and characteristics of the existing converter by responding to multiple-fault with a small number of converters through a novel LLC resonant converter with high reliability according to embodiments of the present invention. Also, the proposed LLC resonant converter may be applied to various E-mobility applications, and may be widely used in a market without increasing complexity of the system because it uses a half-bridge structure widely used in industry and maintains the existing operation and characteristics.

BRIEF DESCRIPTION OF THE DRAWINGS

These and/or other aspects, features, and advantages of the disclosure will become apparent and more readily appreciated from the following description of embodiments, taken in conjunction with the accompanying drawings of which.

DETAILED DESCRIPTION

A fault-tolerant convert is widely used in high-reliability applications. To satisfy the high-reliability requirements, fault tolerance is an essential feature and may be achieved by redundant converts. However, a large number of redundant converters degrade the overall power density and cost. The present invention proposes a novel fault-tolerant LLC converter, which may reduce the number of redundant converters.

FIG. 2 is a schematic diagram illustrating a novel LLC resonant converter with high reliability according to one embodiment of the present invention.

Figure 1:
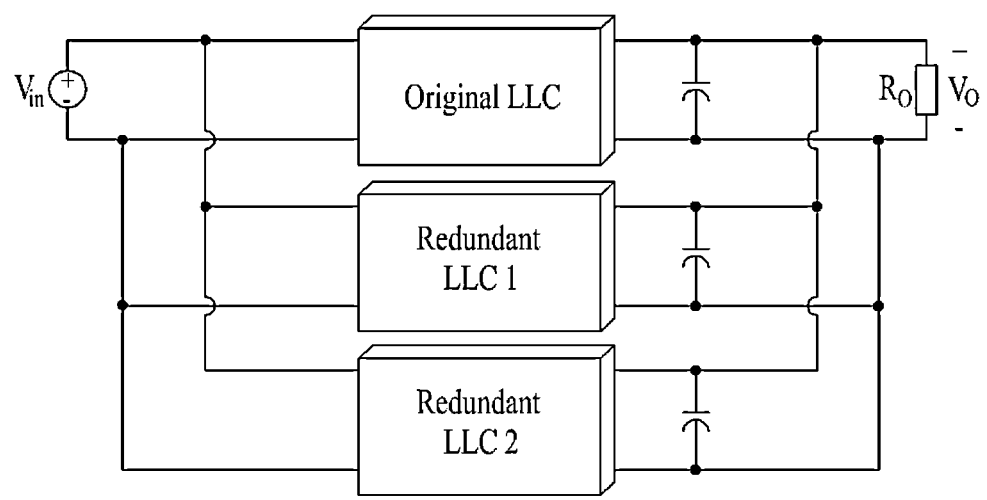
FIG. 1 is a drawing for describing double fault-tolerant capabilities according to the prior art.
Figure 2A:
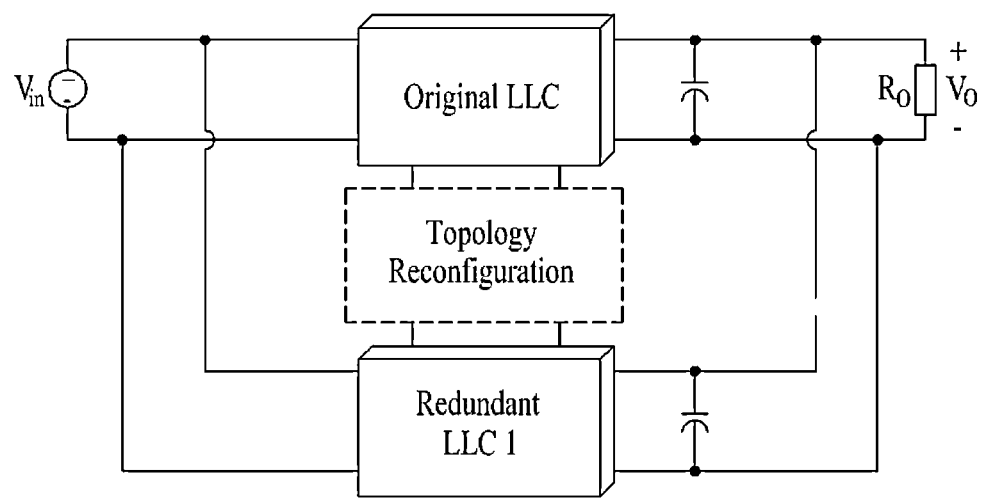
FIG. 2 is a schematic diagram illustrating a novel LLC resonant converter with high reliability according to one embodiment of the present invention.

A structure of a fault-tolerant LLC converter according to embodiments of the present invention is based on input-parallel, output-series two half-bridge LLC converters and a midpoint connection on a secondary side. The proposed converter may withstand double SCFs (Short-Circuit Faults) by utilizing only two converters instead of three converters, and it may achieve high power density and low cost, as shown in FIG. 2(a). A redundant converter is used to achieve a single-fault tolerant capability. When a second SCF occurs in a switch, the proposed converter is reconfigured to regulate the output voltage with only one redundant converter without additional semiconductor components. Also, two converters may be operated simultaneously because the midpoint is connected to the static point where the voltage does not change with any operation. Furthermore, the efficiency and dynamics of the proposed converter are not degraded due to the same equivalent circuit under all fault conditions. As a result, the proposed converter improves most of the drawbacks that occurred in previous studies.

By analyzing the proposed converter, it is demonstrated that the proposed converter achieves high power density and low cost without degradation of efficiency. In addition, it may be easily extended to have multiple fault-tolerant capabilities. Finally, the performance and feasibility of the proposed converter were confirmed with a 100V/12A 1200 W prototype. Hereinafter, embodiments of the present invention will be described in detail with reference to the accompanying drawings.

Figure 2B:
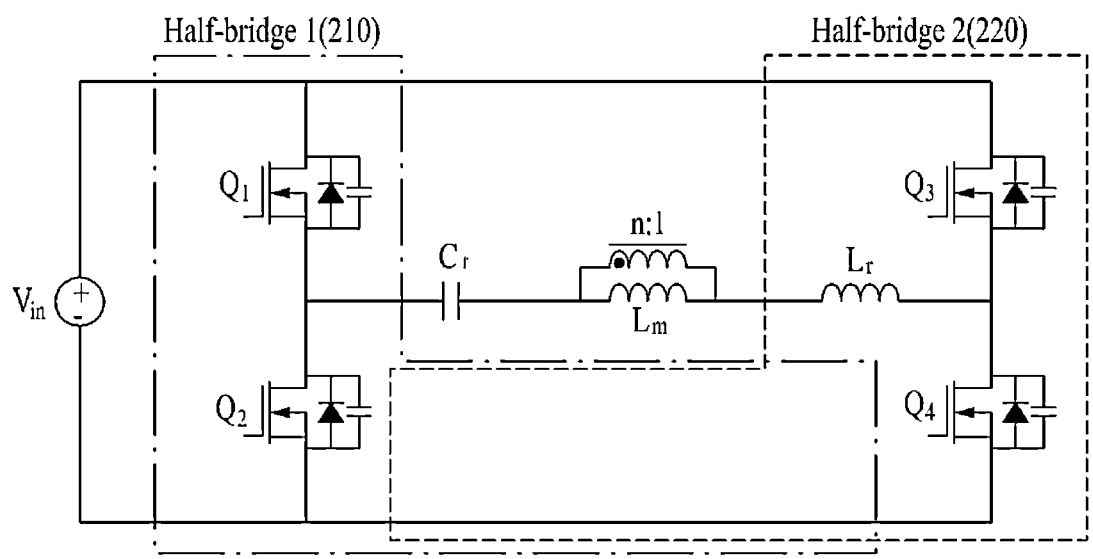

FIG. 2(b) is a circuit diagram illustrating an original converter of a LLC resonant converter according to one embodiment of the present invention.

A full-bridge cell is a structure in which two half-bridge cells 210, 220 are integrated, as shown in FIG. 2(b). Therefore, the two half-bridge cells may perform the same operation as the full-bridge cell.

FIG. 3 is a drawing illustrating a configuration of a novel LLC resonant converter with high reliability according to one embodiment of the present invention.

Figure 3A:
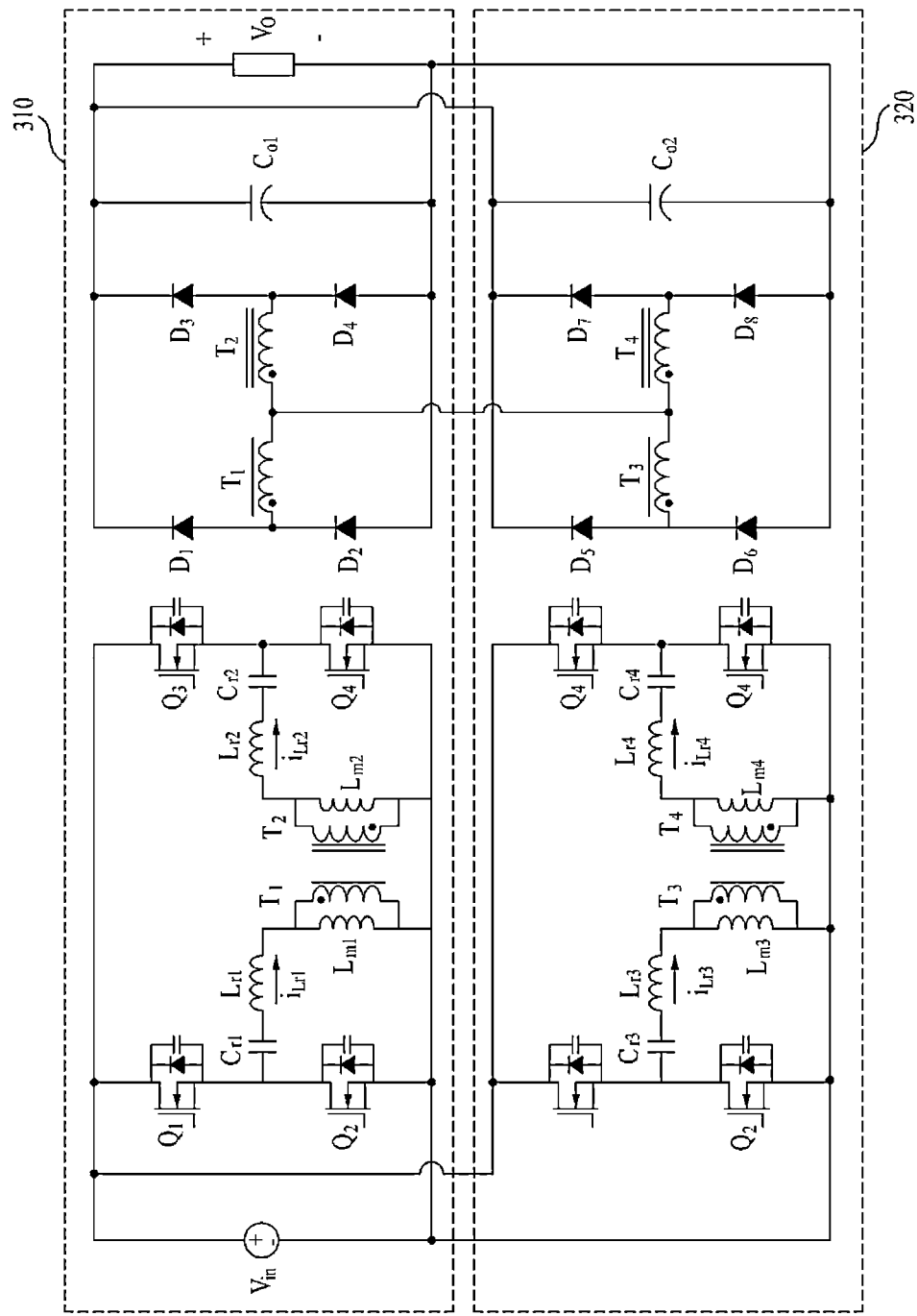
FIG. 3 is a drawing illustrating a configuration of a novel LLC resonant converter with high reliability according to one embodiment of the present invention.
Figure 3B:
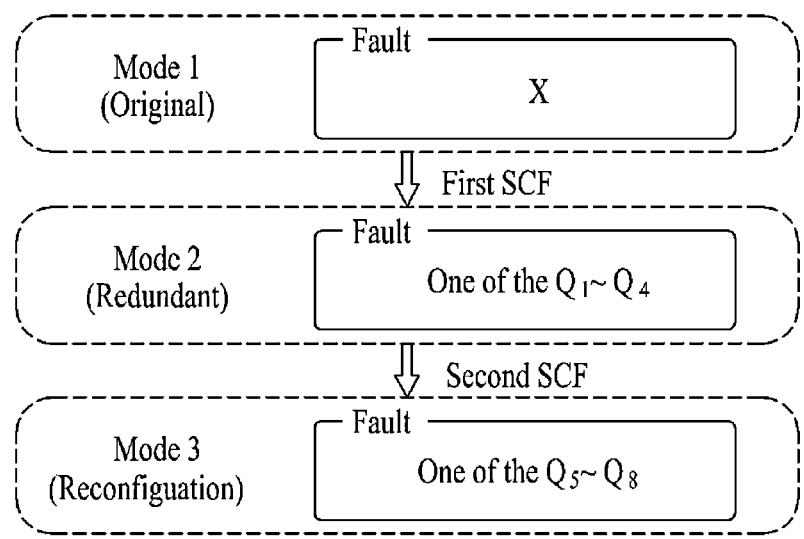

FIG. 3(a) illustrates a structure of a LLC resonant converter according to embodiments of the present invention, and FIG. 3(b) illustrates an operation mode of the LLC resonant converter according to embodiments of the present invention.

As shown in FIG. 3(a), the present invention proposes a new circuit configuration utilizing two half-bridge cells according to one embodiment of the present invention. One full-bridge cell is replaced by two half-bridge cells connected in parallel on the primary side and series on the secondary side.

Referring to FIG. 3(b), the proposed LLC resonant converter may withstand double SCFs. For example, a fault occurs in one switch of a plurality of switches of the original converter, a redundant converter is used to regulate the output voltage. After a fault occurs in one switch of a plurality of switches of the redundant converter, the secondary windings are stacked using two healthy half-bridge cells of the original and redundant converters. As a result, the output voltage may be maintained constant. The equivalent circuit of the proposed converter does not change under all fault conditions. In addition, it is the same as the equivalent circuit of the conventional LLC converter. Therefore, the original converter and the redundant converter have the same characteristics, such as component design, operating frequency, and control dynamics.

The LLC resonant converter with high reliability according to embodiments of the present invention includes an original converter 310 and a redundant converter 320.

The original converter 310 according to embodiments of the present invention includes a primary side circuit on which two half-bridge cells are connected in parallel and a secondary side circuit on which two half-bridge cells are connected in series.

The primary side circuit of the original converter 310 according to embodiments of the present invention includes a first half-bridge cell including two switches $Q_1$ and $Q_2$, and a second half-bridge cell including two switches $Q_3$ and $Q_4$.

From the primary side circuit of the original converter 310 according to embodiments of the present invention, the two switches $Q_1$ and $Q_2$ have complementary duty cycles, and the two switches $Q_3$ and $Q_4$ have complementary duty cycles.

The redundant converter 320 according to embodiments of the present invention has the same configuration with the original converter 310, and is connected with the original converter 310 at a midpoint of a secondary wingding.

A primary side circuit of the redundant converter 320 according to embodiments of the present invention includes a first half-bridge cell including two switches $Q_5$ and $Q_6$, and a second half-bridge cell including two switches $Q_7$ and $Q_8$.

From the primary side circuit of the redundant converter 320 according to embodiments of the present invention, the two switches $Q_5$ and $Q_6$ have complementary duty cycles, and the two switches $Q_7$ and $Q_8$ have complementary duty cycles.

PFM (Pulse Frequency Modulation) control is used to regulate output voltage of the LLC resonant converter with high reliability according to embodiments of the present invention.

When the plurality of switches $Q_1$ to $Q_4$ of the original converter 310 according to embodiments of the present invention operate normally (Mode 1), the original converter 310 controls output voltage, and the redundant converter 320 remains inactive.

When the LLC resonant converter according to embodiments of the present invention operates in Mode 1, current of the original converter 310 does not flow through the secondary winding of the redundant converter 320 interconnected with the original converter 310, and the plurality of switches $Q_1$ to $Q_4$ of the original converter 310 and a plurality of diodes $D_1$ to $D_4$ of the secondary side circuit of the original converter 310 may achieve a ZVS (Zero Voltage Switching).

When a single-fault occurs in one of the plurality of switches $Q_1$ to $Q_4$ of the original converter 310 according to embodiments of the present invention (Mode 2), the redundant converter 320 is used to control output voltage.

When the LLC resonant converter according to embodiments of the present invention operates in Mode 2, gate drive signals of the plurality of switches $Q_1$ to $Q_4$ of the original converter 310 are disabled, and the redundant converter 320 operates.

At this time, current of the redundant converter 320 does not flow through the secondary winding of the original converter 310 interconnected with the redundant converter 320, and the plurality of switches $Q_5$ to $Q_8$ of the redundant converter 320 and a plurality of diodes $D_5$ to $D_8$ of the secondary side circuit of the redundant converter 320 may achieve a ZVS (Zero Voltage Switching).

When a double-fault in which a fault occurs in one of the plurality of switches $Q_1$ to $Q_4$ of the original converter 310 according to embodiments of the present invention, and at the same time a fault occurs in one of the plurality of switches $Q_5$ to $Q_8$ of the redundant converter 320 occurs (Mode 3), the converter is reconfigured by utilizing half-bridge cell which is normally operated among half-bridge cells of the original converter 310 and the redundant converter 320.

When the LLC resonant converter according to embodiments of the present invention operates in Mode 3, the converter is reconfigured by utilizing combination of half-bridge cells which are normally operated among first half-bridge cell and second half-bridge cell of the primary side circuit of the original converter 310, and first half-bridge cell and second half-bridge cell of the primary side circuit of the redundant converter 320.

At this time, the LLC resonant converter controls output voltage by transferring voltage to corresponding transformer of the secondary side circuit of the original converter and the secondary side circuit of the redundant converter through a primary side transformer operating in the converter which is reconfigured with the combination of half-bridge cells which are normally operated.

Figure 4:
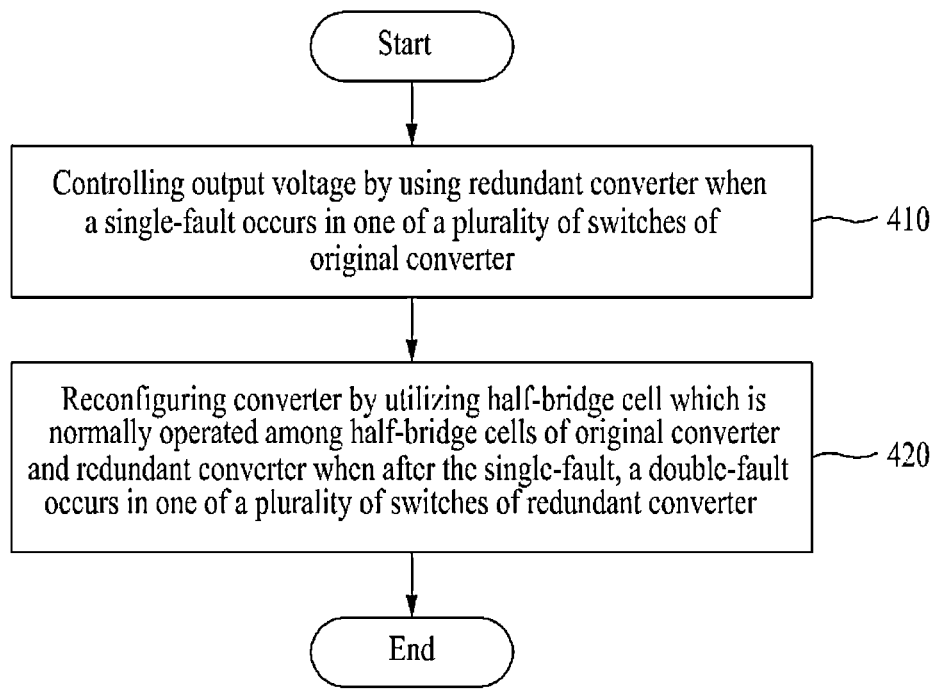
FIG. 4 is a flow chart for describing an operation method of a novel LLC resonant converter with high reliability according to one embodiment of the present invention.

FIG. 4 is a flow chart for describing an operation method of a novel LLC resonant converter with high reliability according to one embodiment of the present invention.

According to embodiments of the present invention, an operation method of a LLC resonant converter including an original converter including a primary side circuit on which two half-bridge cells are connected in parallel and a secondary side circuit on which two half-bridge cells are connected in series and a redundant converter having the same configuration with the original converter, and connected with the original converter at the midpoint of a secondary wingding includes controlling output voltage by using the redundant converter when a single-fault occurs in one of a plurality of switches $Q_1$ to $Q_4$ of the original converter 410, and reconfiguring a converter by utilizing half-bridge cell which is normally operated among half-bridge cells of the original converter and the redundant converter when a double-fault that after the single-fault, a fault occurs in one of a plurality of switches $Q_5$ to $Q_8$ occurs 420.

The operation method of the LLC resonant converter with high reliability according to one embodiment of the present invention further includes normally operating the plurality of switches $Q_1$ to $Q_4$ of the original converter (Mode 1).

When the plurality of switches $Q_1$ to $Q_4$ of the original converter according to embodiments of the present invention are normally operated (Mode 1), the original converter controls output voltage, and the redundant converter remains inactive.

When the LLC resonant converter according to embodiments of the present invention operates in Mode 1, current of the original converter does not flow through the secondary winding of the redundant converter interconnected with the original converter, and the plurality of switches $Q_1$ to $Q_4$ of the original converter and a plurality of diodes $D_1$ to $D_4$ of the secondary side circuit of the original converter may achieve a ZVS (Zero Voltage Switching).

In Step 410 according to embodiments of the present invention, when a single-fault occurs in one of the plurality of switches $Q_1$ to $Q_4$ of the original converter (Mode 2), output voltage is controlled by using the redundant converter.

When the LLC resonant converter according to embodiments of the present invention operates in Mode 2, gate drive signals of the plurality of switches $Q_1$ to $Q_4$ of the original converter is disables, and the redundant converter is operated.

At this time, current of the redundant converter does not flow through the secondary winding of the original converter interconnected with the redundant converter, and the plurality of switches $Q_5$ to $Q_8$ of the redundant converter and a plurality of diodes $D_5$ to $D_8$ of the secondary side circuit of the redundant converter may achieve a ZVS (Zero Voltage Switching).

In Step 420 according to embodiments of the present invention, when a double-fault in which a fault occurs in one of the plurality of switches $Q_1$ to $Q_4$ of the original converter, and at the same time a fault occurs in one of the plurality of switches $Q_5$ to $Q_8$ of the redundant converter occurs (Mode 3), a converter is reconfigured by utilizing half-bridge cell which is normally operated among half-bridge cells of the original converter and the redundant converter.

When the LLC resonant converter according to embodiments of the present invention operates in Mode 3, the converter is reconfigured by utilizing combination of half-bridge cells which are normally operated among first half-bridge cell and second half-bridge cell of the primary side circuit of the original converter, and first half-bridge cell and second half-bridge cell of the primary side circuit of the redundant converter.

At this time, the LLC resonant converter may control output voltage by transferring voltage to corresponding transformer of the secondary side circuit of the original converter and the secondary side circuit of the redundant converter through a primary side transformer operating in the converter which is reconfigured with the combination of half-bridge cells which are normally operated.

Figure 5:
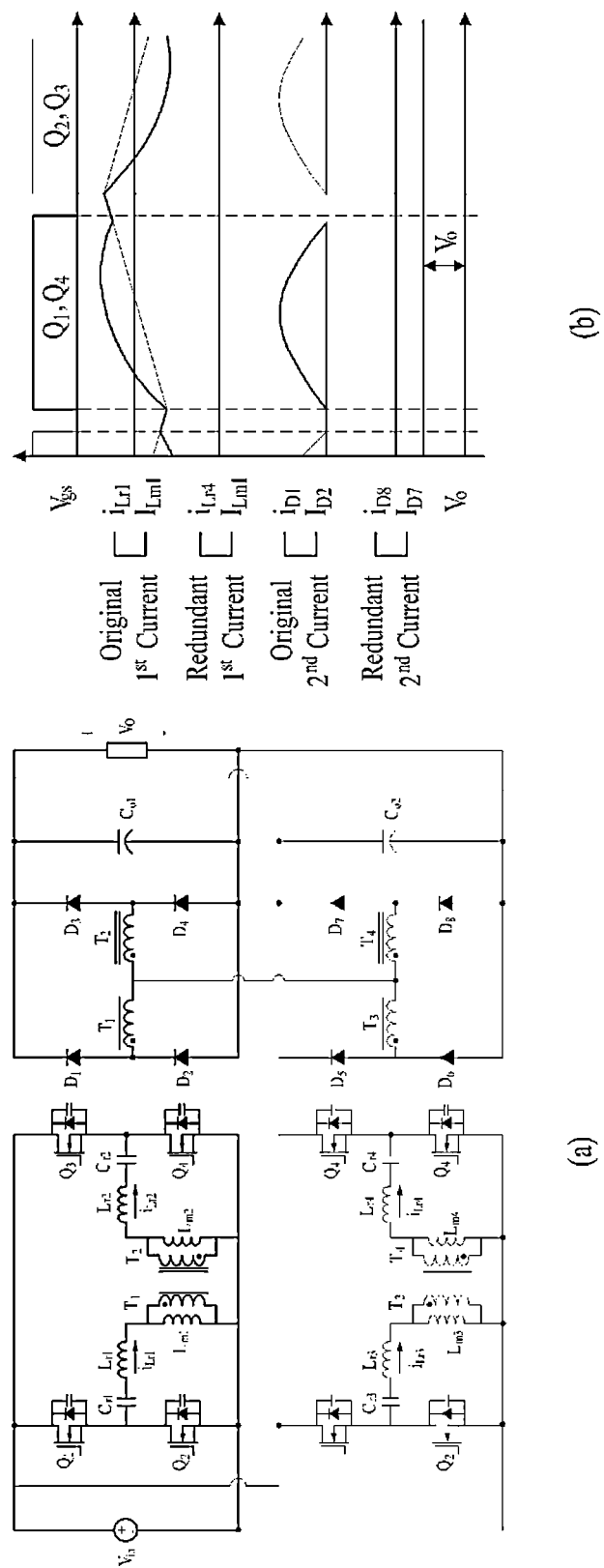
FIG. 5 is a drawing for describing an operation in Mode 1 of a LLC resonant converter according to one embodiment of the present invention.

FIG. 5 is a drawing for describing an operation in Mode 1 of a LLC resonant converter according to one embodiment of the present invention.

Under steady-state conditions, the operating principle of the LLC resonant converter according to embodiments of the present invention is similar to the conventional LLC converter except for the fault operation. Thus, it focuses on the remedial action by the SCFs of switches for convenience of description. For a simple analysis, several assumptions are made, which are listed below:

1) All components are ideal except for components shown in FIG. 3(a).
2) The tolerance of the component is small enough, and it is ignored.
3) The operation by the SCF of each switch is similar. Thus, the SCFs of switches $Q_4$ and $Q_5$ are described as an example.

FIG. 5(a) illustrates an operation of an original converter in Mode 1 according to one embodiment of the present invention, and FIG. 5(b) illustrates key waveforms.

Switches $Q_1$, $Q_2$ and $Q_3$, $Q_4$ according to embodiments of the present invention have complementary duty cycles, and PFM (Pulse Frequency Modulation) control is used to regulate output voltage. In Mode 1 according to embodiments of the present invention, the original converter keeps the output voltage constant, whereas the redundant converter remains inactive. Although the midpoints of the secondary windings of the original converter and the redundant converter are connected, the current does not flow through the redundant converter. Also, the original converter has the same waveforms as the conventional LLC converter, as shown in FIG. 5(b). Thus the original convert may achieve a ZVS (Zero Voltage Switching) on switches $Q_1$ to $Q_4$ and ZCS (Zero Current Switching) on diodes $D_1$ to $D_2$.

Figure 6A:
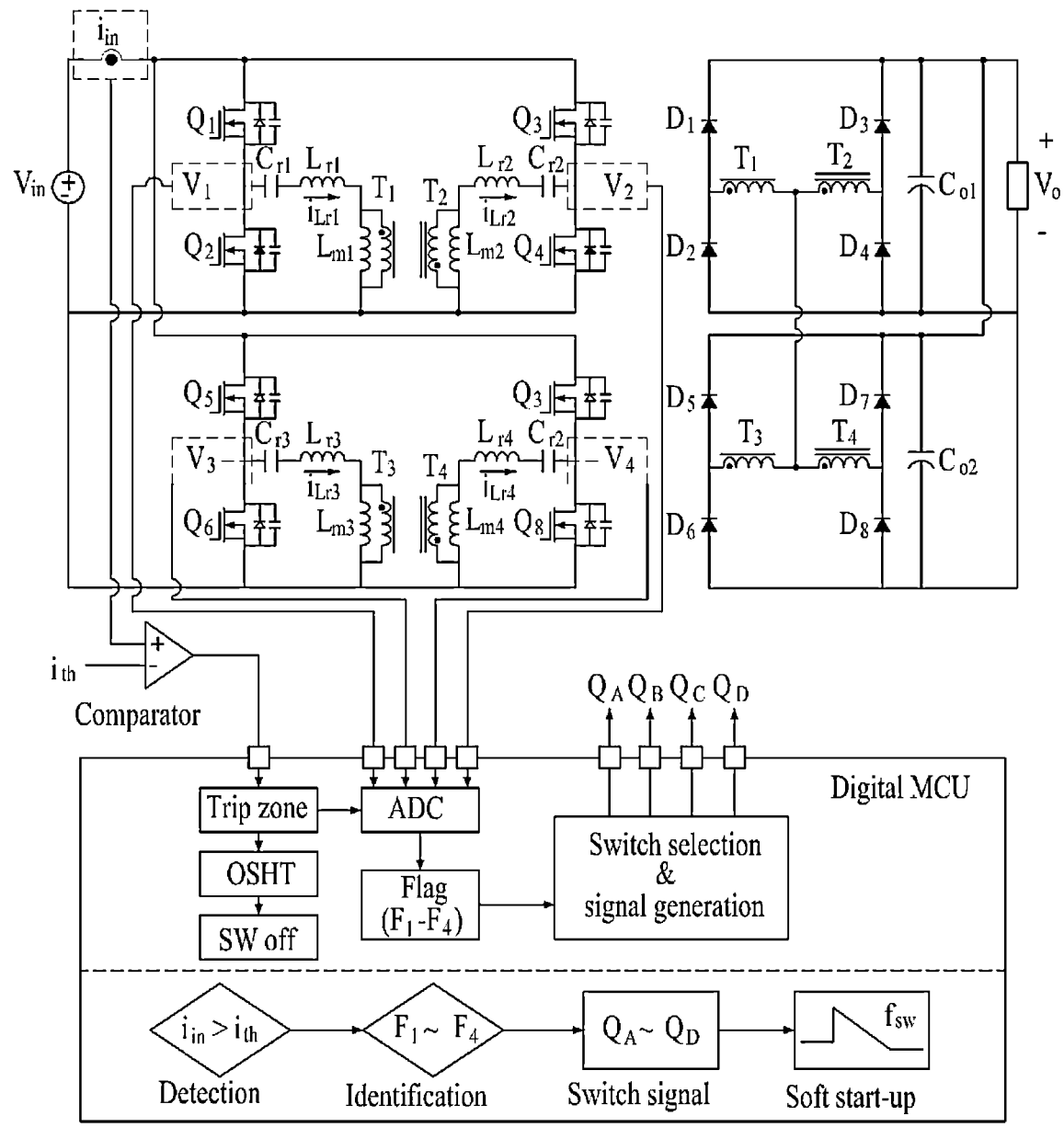
FIG. 6 is a drawing for describing error detection order according to one embodiment of the present invention.

FIG. 6 is a drawing for describing error detection order according to one embodiment of the present invention.

It is important to detect SCF and identify faulty switches for high reliability. Input current, leg midpoint voltage or drain-source voltage are measured, and such method has already been applied to many IC chips.

The proposed converter uses a voltage/current measurement which is one of the existing methods. SCF monitors and detect input current and leg midpoint voltage as FIG. 6(a). Hardware and software implementations of the proposed transformer are as follows. First, a rapid rise of input current is quickly detected through a current sensor and a high-performance comparator. At this time, the switch is immediately turned off by trip zone module of digital MCU. Second, the digital MCU captures leg midpoint voltage $V_1$ to $V_4$ triggered by trip zone signals.

Therefore, the location of the faulty switch is found as Table 1.

TABLE 1

|  | $Q_{1,4}$ on | $Q_{2,3}$ on | $Q_{5,8}$ on | $Q_{6,7}$ on |
|---|---|---|---|---|
| $i_{in} >$ $i_{th}$ | V1 decreases Q2 SCF (F1) V2 increases Q3 SCF (F2) | V1 increases Q1 SCF (F1) V2 decreases Q4 SCF (F2) | V3 decreases Q6 SCF (F3) V4 increases Q7 SCF (F4) | V3 increases Q5 SCF (F3) V4 decreases Q8 SCF (F4) |

$F_i$ (i=1, 2, 3 or 4) represents SCF flag of each leg $Q_{1-2}$, $Q_{3-4}$, $Q_{5-6}$, $Q_{7-8}$, and they are all 0 in Mode 1. For example, if SCF occurs in the switch $Q_5$, the input current rapidly increases through shoot-through when the switch $Q_6$ turns on.

Figure 6B:
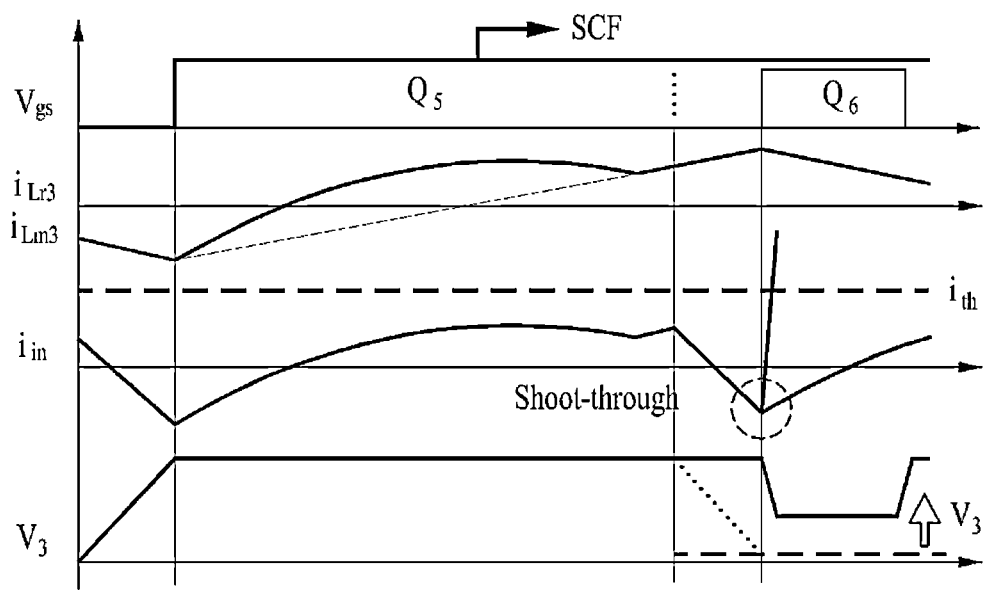

Then, since half of the input voltage is applied to two switches, the leg midpoint voltage $V_3$ increases compared to zero voltage when normally operating. As a result, error detection and identification may be achieved by monitoring input current and leg midpoint voltage. Main wave for SCF of switch $Q_5$ is illustrated in FIG. 6(b).

Figure 7:
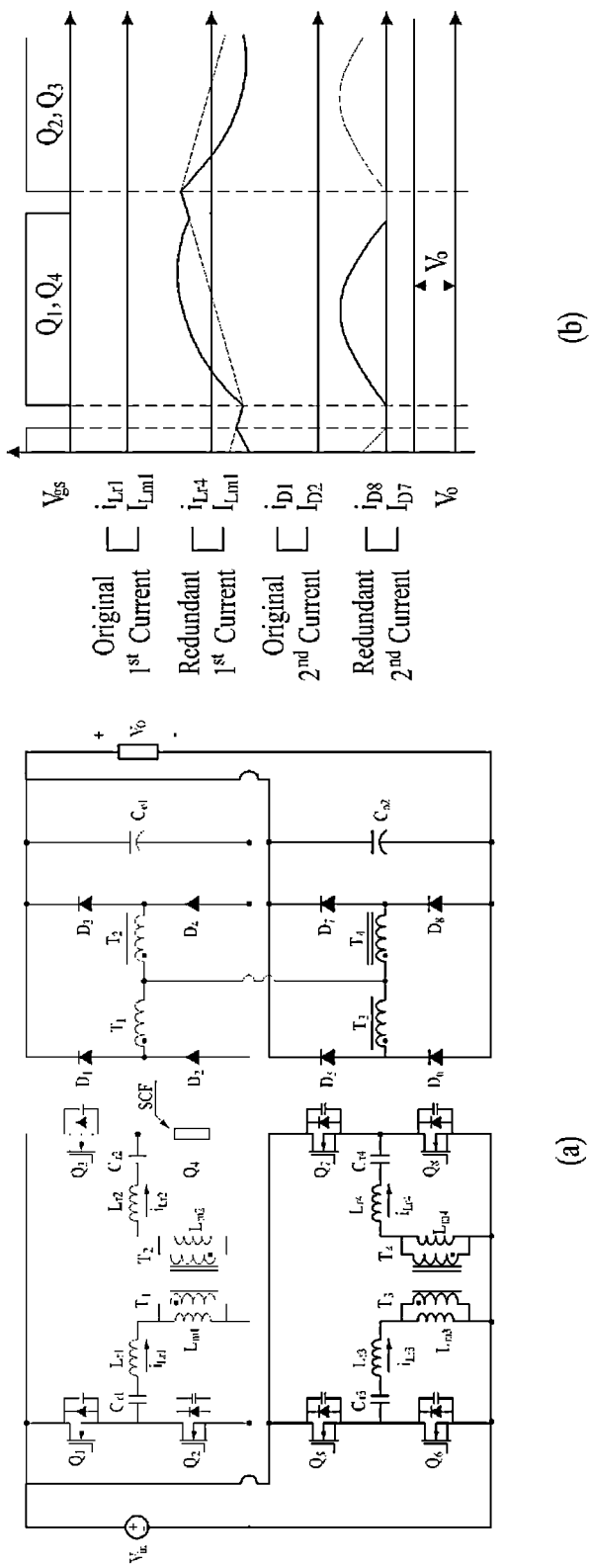
FIG. 7 is a drawing for describing an operation in Mode 2 of a LLC resonant converter according to one embodiment of the present invention.

FIG. 7 is a drawing for describing an operation in Mode 2 of a LLC resonant converter according to one embodiment of the present invention.

FIG. 7(a) illustrates operation of a LLC resonant converter in Mode 2 according to one embodiment of the present invention, and FIG. 7(b) illustrates key wave forms.

In FIG. 7(a), SCF occurs in one of switches $Q_1$ to $Q_4$. Because single-fault operation of all switches is similar, it is assumed that SCF occurred in switch $Q_4$. Once the SCF is detected, gate drive signals of the original converter are disabled, and the redundant converter begins to operate, as shown in FIG. 7(b). The operating principle of the redundant converter is the same as that of the original converter in Mode 1.

The redundant converter in Mode 2 according to embodiments of the present invention keeps the output voltage constant, whereas the original converter remains inactive. Although the midpoints of the second windings of the original converter and the redundant converter are connected, the current does not flow the original convert. Also, the redundant converter has the same waveforms as the conventional LLC converter as shown in FIG. 7(b). Thus, the redundant converter may achieve a ZVS (Zero Voltage Switching) on switches $Q_5$ to $Q_8$ and ZCS (Zero Current Switching) on diodes $D_5$ to $D_8$ of the secondary side circuit under the same conditions.

Figure 8:
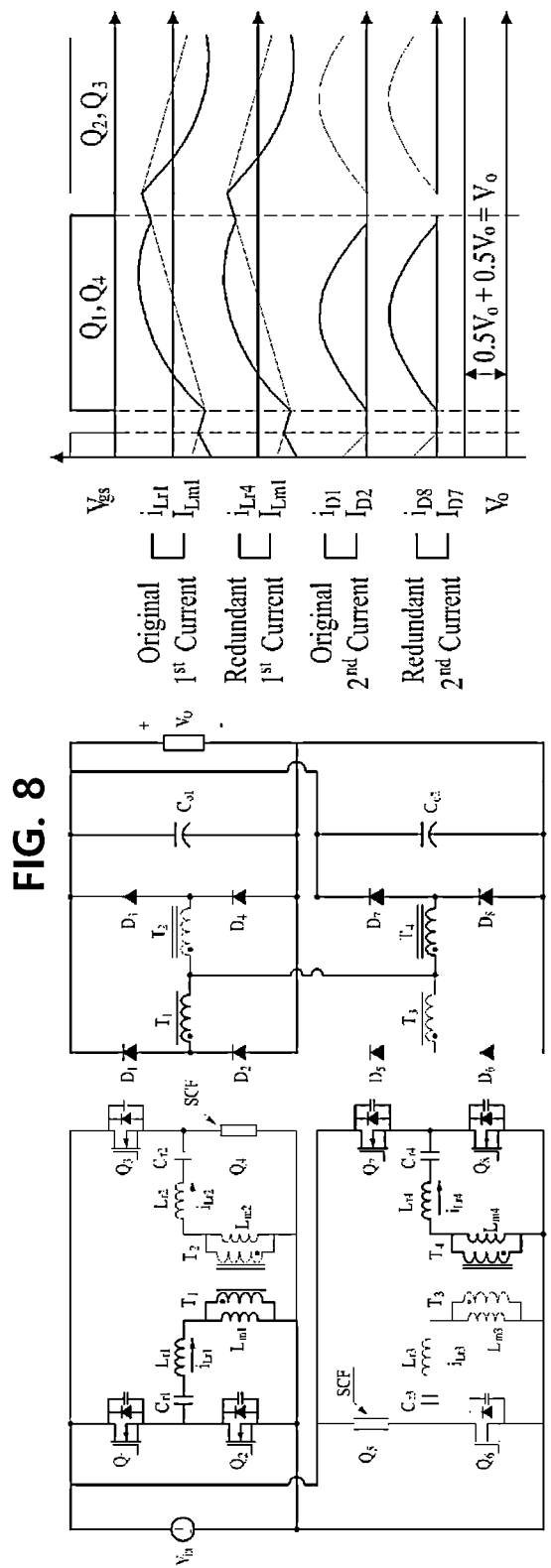
FIG. 8 is a drawing for describing an operation in Mode 3 of a LLC resonant converter according to one embodiment of the present invention.

FIG. 8 is a drawing for describing an operation in Mode 3 of a LLC resonant converter according to one embodiment of the present invention.

FIG. 8(a) illustrates operations of an original converter and a redundant converter in Mode 3 according to one embodiment of the present invention, and FIG. 8(b) illustrates key waveforms.

In FIG. 8(a), after SCF occurs in one of switches $Q_5$ to $Q_8$, the proposed converter is reconfigured by utilizing the healthy half-bridge cell of the half-bridge cells of the original converter and the redundant converter. Due to similarity of all double-fault operations, it is assumed that SCF occurred in the switch $Q_5$. Once the second SCF is detected in the switch $Q_5$, complementary switches of faulty legs are turned off. Then, two half-bridge cells corresponding to transformers $T_1$ and $T_4$ operate to keep the output voltage constant. Through the midpoint connection, their secondary windings are naturally connected in series, as shown in FIG. 8(a).

Figure 9:
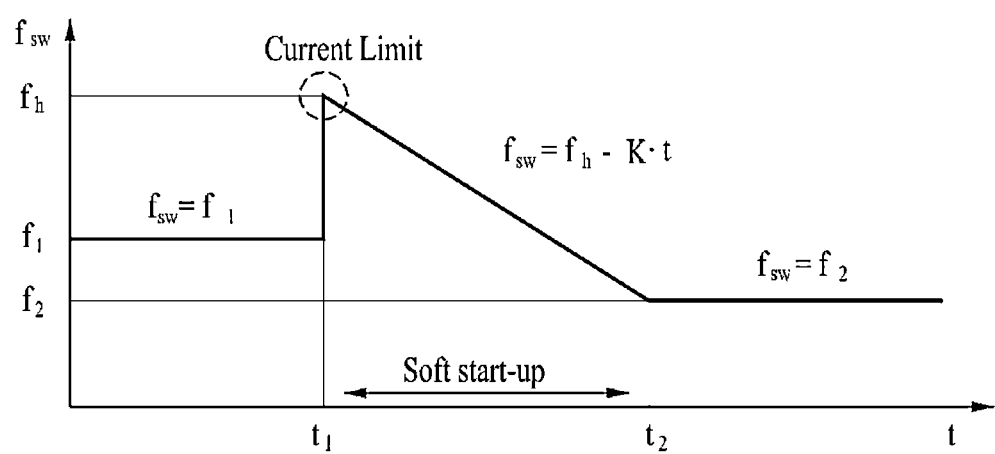
FIG. 9 is a drawing for describing a soft start-up sequence according to one embodiment of the present invention.

FIG. 9 is a drawing for describing a soft start-up sequence according to one embodiment of the present invention.

The SCFs of the switches $Q_4$ and $Q_5$ are described in Mode 3. However, operations by SCFs of other switches are similar. Main principle of switch signals is that a switch of a faulty leg is turned off and diagonal switches of two healthy half-bridge cells are driven by the same switch signals. Detailed switch signals are summarized in Table 2.

TABLE 2

|  | $Q_1$ | $Q_2$ | $Q_3$ | $Q_4$ | $Q_5$ | $Q_6$ | $Q_7$ | $Q_8$ |
|---|---|---|---|---|---|---|---|---|
| Mode 1 ($F_1 = F_2 = F_3 = F_4 = 0$) | $DR_A$ | $DR_B$ | $DR_B$ | $DR_A$ | 0 | 0 | 0 | 0 |
| Mode 2 ($F_1 + F_2 = 1$, $F_3 = F_4 = 0$) | 0 | 0 | 0 | 0 | $DR_A$ | $DR_B$ | $DR_B$ | $DR_A$ |
| Mode 3-1 ($F_1 = F_3 = 1$, $F_2 = F_4 = 0$) | 0 | 0 | $DR_A$ | $DR_B$ | 0 | 0 | $DR_B$ | $DR_A$ |
| Mode 3-2 ($F_1 = F_4 = 1$, $F_2 = F_3 = 0$) | 0 | 0 | $DR_A$ | $DR_B$ | $DR_B$ | $DR_A$ | 0 | 0 |
| Mode 3-3 ($F_2 = F_3 = 1$, $F_1 = F_4 = 0$) | $DR_A$ | $DR_B$ | 0 | 0 | 0 | 0 | $DR_B$ | $DR_A$ |
| Mode 3-4 ($F_2 = F_4 = 1$, $F_1 = F_3 = 0$) | $DR_A$ | $DR_B$ | 0 | 0 | $DR_B$ | $DR_A$ | 0 | 0 |

DRA and DRB represent complementary switch signals. Also, the two healthy half-bridge cells are operated by SCF flags $F_1$ to $F_4$. Consequently, the proposed transformer may simply drive all SCFs by applying the same switch signals to the diagonal switches of the healthy half-bridge cells.

High current spikes may occur during mode conversions. Therefore, a soft start-up method is applied to the proposed converter. Once the mode conversion begins, the switching frequency immediately increases to $F_h$ as shown in FIG. 9. Since high switching frequency reduces accumulation time of current, the current spikes may be limited. Then, the switching frequency decreases to operation frequency $F_2$ for normal operation.

Figure 10:
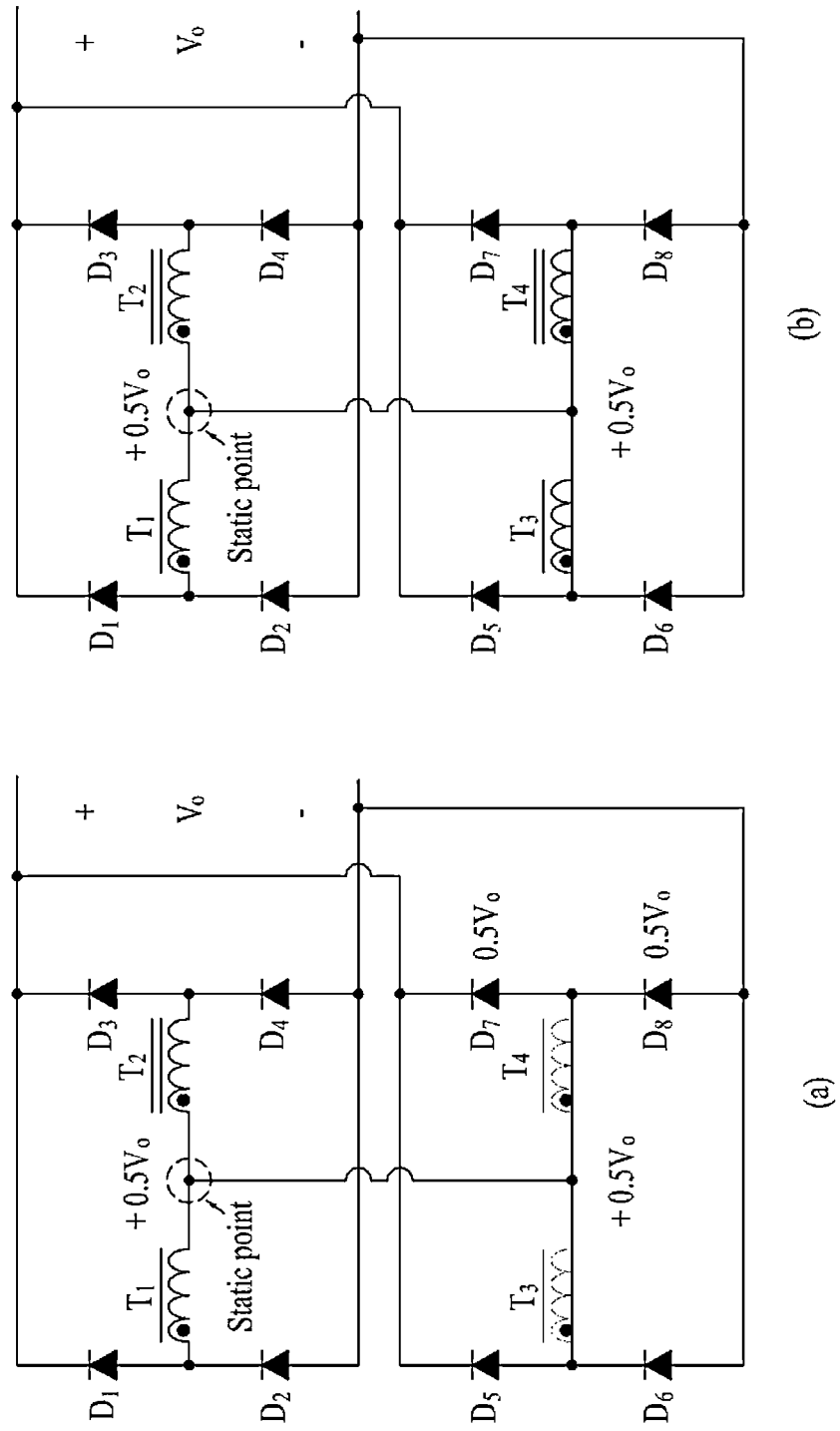
FIG. 10 is a drawing for describing a cold redundancy and a hot redundancy according to one embodiment of the present invention.

FIG. 10 is a drawing for describing a cold redundancy and a hot redundancy according to one embodiment of the present invention.

FIG. 10(a) is a drawing for describing a cold redundancy, and FIG. 10(b) is a drawing for describing a hot redundancy.

Transformers of each half-bridge cell of an original converter and a redundancy converter are connected in series on the secondary side. Hence, half the output voltage is applied at the midpoint of the secondary windings, as shown in FIG. 10. In particular, this midpoint has several features. First, double fault-tolerant capabilities may be achieved by stacking the secondary windings. If the SCF occurs in any switch, the midpoint connection simply stacks healthy secondary windings in series. That is, half the output voltages are added to each other. Second, the midpoint connection allows cold redundancy, as shown in FIG. 10(a). Only the original converter operates, and the redundant converter is shut down. Accordingly, half the output voltages are applied to transformers $T_1$ and $T_2$, and transformers $T_3$ and $T_4$ maintain zero voltage. Moreover, the proposed LLC resonant converter utilizes the existing diodes of a redundant converter instead of additional semiconductor components. Diodes of the redundant converter may not be conducted, and half the output voltage is applied to them. As a result, since the midpoint voltages of two converters are naturally matched to half the output voltage, the proposed LLC resonant converter may operate with cold redundancy. Lastly, unlike the prior arts, the midpoint connection also allows hot redundancy, as shown in FIG. 10(b). Because the midpoint voltage always maintains half the output voltage regardless of any switching frequency or phase, both converters may be operated simultaneously.

Figure 11:
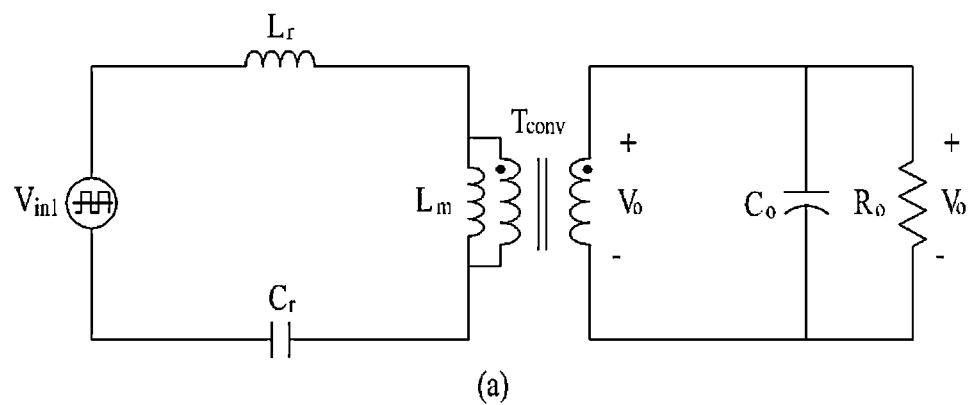
FIG. 11 is a drawing for comparing a LLC resonant converter according to one embodiment of the present invention and a LLC resonant converter of the prior art.
Figure 11:
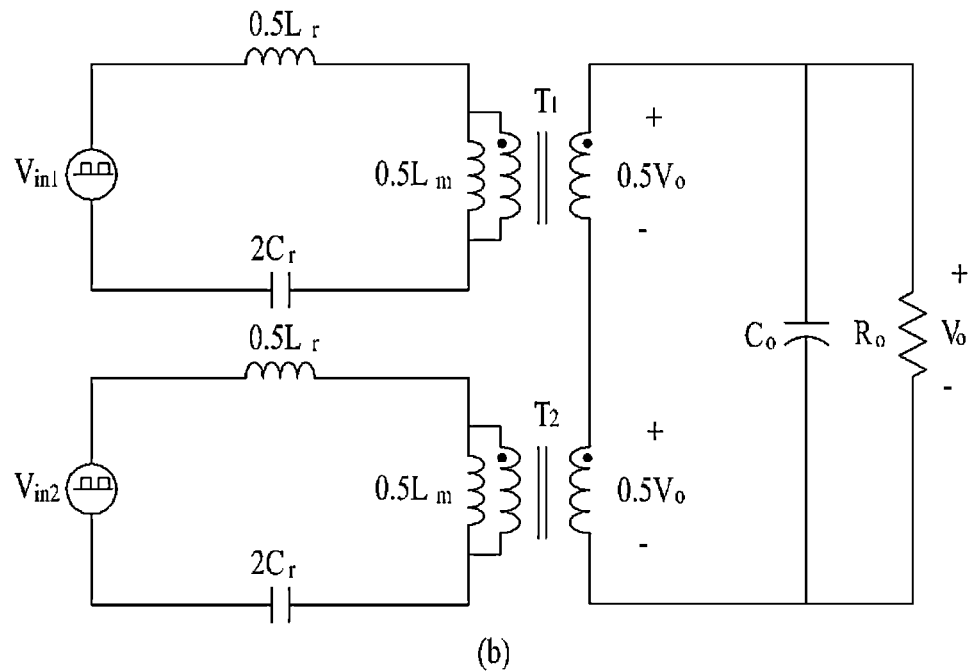

FIG. 11 is a drawing for comparing a LLC resonant converter according to one embodiment of the present invention and a LLC resonant converter of the prior art.

FIG. 11(a) illustrates equivalent circuit of a LLC resonant converter of the prior art, and FIG. 11(b) illustrates equivalent circuit of a LLC resonant converter according to embodiments of the present invention.

Referring to FIG. 11, voltage gain, ZVS condition, and resonant tank design which are related to the equivalent circuit are analyzed. Due to the input-parallel, output-series two half-bridge structure, the resonant tank of the proposed LLC resonant converter is designed as follows:

$$L_{m.prop}=0.5L_m, L_{r.prop}=0.5L_r, C_{r.prop}=2C_r, \quad \text{Equation 1}$$

where $L_{m.prop}$, $L_{r.prop}$, $C_{r.prop}$ are the magnetizing inductance, resonant inductance, and resonant capacitance of the proposed converter, respectively, and $L_m$, $L_r$, $C_r$ are the magnetizing inductance, resonant inductance, and resonant capacitance of the converter of the prior art, respectively.

First, the voltage gain of the LLC converter is analyzed based on the FHA (Fundamental Harmonic Approximation). The conversion ratio of $V_o$ for $V_{in}$ (=M, $M_{prop}$) may be represented as follows:

$$M = \cfrac{1}{n\sqrt{\left[1+\cfrac{L_r}{L_m}\left(1-\cfrac{f_r^2}{f_s^2}\right)\right]^2 + \left[\cfrac{f_s}{f_r}-\cfrac{f_r}{f_s}\right]^2 \cdot \left[\cfrac{n^2}{8n^2R}\sqrt{\cfrac{L_r}{C_r}}\right]^2}} \quad \text{Equation 2}$$

$$M_{prop} = \cfrac{1}{n\sqrt{\left[1+\cfrac{0.5L_r}{0.5L_m}\left(1-\cfrac{f_r^2}{f_s^2}\right)\right]^2 + \left[\cfrac{f_s}{f_r}-\cfrac{f_r}{f_s}\right]^2 \cdot \left[\cfrac{\pi^2}{8n^2(0.5R)}\sqrt{\cfrac{0.5L_r}{2C_r}}\right]^2}} \quad \text{Equation 3}$$

Where n is the turns ratio, $f_s$ is the switching frequency, $f_r$ is the resonant frequency, and R is the load resistance.

From Equations 2 and 3, the voltage gains M and $M_{prop}$ are the same when two converters have the same turns ratio. Therefore, with the same turns ratio and resonant tank as Equation 1, their operating frequency range is also the same.

Second, the ZVS condition of the LLC converter is determined by the minimum magnetizing current. The detailed formulas may be represented as follows:

$$i_{Lm(min)} = \frac{nV_0}{4L_m f_{s \cdot max}}, \quad \text{Equation 4}$$

$$i_{Lm(min) \cdot prop} = \frac{n(0.5 \, V_0)}{4(0.5 L_m) f_{s \cdot max}}, \quad \text{Equation 5}$$

where $i_{Lm(min)}$ is the minimum magnetizing current of the converter of the prior art, and $i_{Lm(min).prop}$ is the minimum magnetizing current of the proposed converter.

As shown in FIG. 11(b), each transformer has half the magnetizing inductance, and half the output voltage is applied there. In addition, the proposed converter has the same operating frequency range as the converter of the prior art. Therefore, from Equations 4 and 5, the minimum magnetizing currents of two converters are the same.

Consequently, the proposed converter has the same ZVS condition as the converter of the prior art. Finally, the resonant tank design of the proposed LLC converter is described. The effective cross-sectional area of the magnetic material and the maximum voltage stress of the resonant capacitor may be represented as follows:

$$A_e = \frac{L_{mag} i_{mag \cdot max}}{N_p B_{max}} \quad \text{Equation 6}$$

$$A_{e \cdot prop} = \frac{(0.5 L_{mag}) i_{mag \cdot max}}{N_p B_{max}} \quad \text{Equation 7}$$

$$V_{cr(max)} = \frac{\sqrt{2} \, i_{Lr \cdot rms}}{2\pi f_s C_r} \quad \text{Equation 8}$$

$$V_{cr(max) \cdot prop} = \frac{1}{2} V_{in} + \frac{\sqrt{2} \, i_{Lr \cdot rms}}{2\pi f_s (2C_r)} \quad \text{Equation 9}$$

where $A_e$ is the effective cross-sectional area of the LLC converter of the prior art, $A_{e.prop}$ is the effective cross-sectional area of the proposed converter, $L_{mag}$ is the inductance of the magnetic material, $i_{mag.max}$ is the maximum current flowing through the magnetic material, $B_{max}$ is the maximum flux density, $V_{cr(max)}$ is the maximum voltage stress on the resonant capacitor of the LLC converter of the prior art, and $V_{cr(max).prop}$ is the maximum voltage stress on the resonant capacitor of the proposed converter.

From Equations 6 and 7, the proposed converter has half the effective cross-sectional area, which means that $A_{e.prop}$ is 0.5 $A_e$. Therefore, it may use half the size of the cores for the transformer and the resonant inductor. Although the proposed converter uses two half-bridge cells, two transformers or two resonant inductors may be integrated into one core by utilizing the outer legs of the magnetic material. As a result, the total core size of the proposed converter is the same as that of the LLC converter of the prior art.

According to example embodiments of the present invention, it needs to withstand the SCFs in multiple switches or SCFs in other components. To be used in various applications, a fault-tolerant converter should be able to achieve multiple fault-tolerant capabilities.

The proposed converter may be extended to have multiple fault-tolerant capabilities by adding redundant converters. Compared with the conventional method, the proposed converter withstands a single SCF by using a half-bridge cell instead of a full-bridge cell. Therefore, the fault-tolerant extendibility of the proposed converter is maximized as the number of converters increases. For example, when three converters are used, the conventional LLC converter may withstand only double SCFs. However, the proposed converter may withstand quadruple SCFs with the same number of converters.

According to the prior art, the diode and output capacitor are also vulnerable components in the converter. Although SCFs occur in them, the proposed converter may still achieve fault-tolerant capabilities. The fault-tolerant operation of diodes or output capacitors is similar to that of the switches. However, additional relays or fuses are required to isolate them. As a result, the proposed converter may be used in various applications because it has a high degree of freedom for fault-tolerance conditions.

Figure 12:
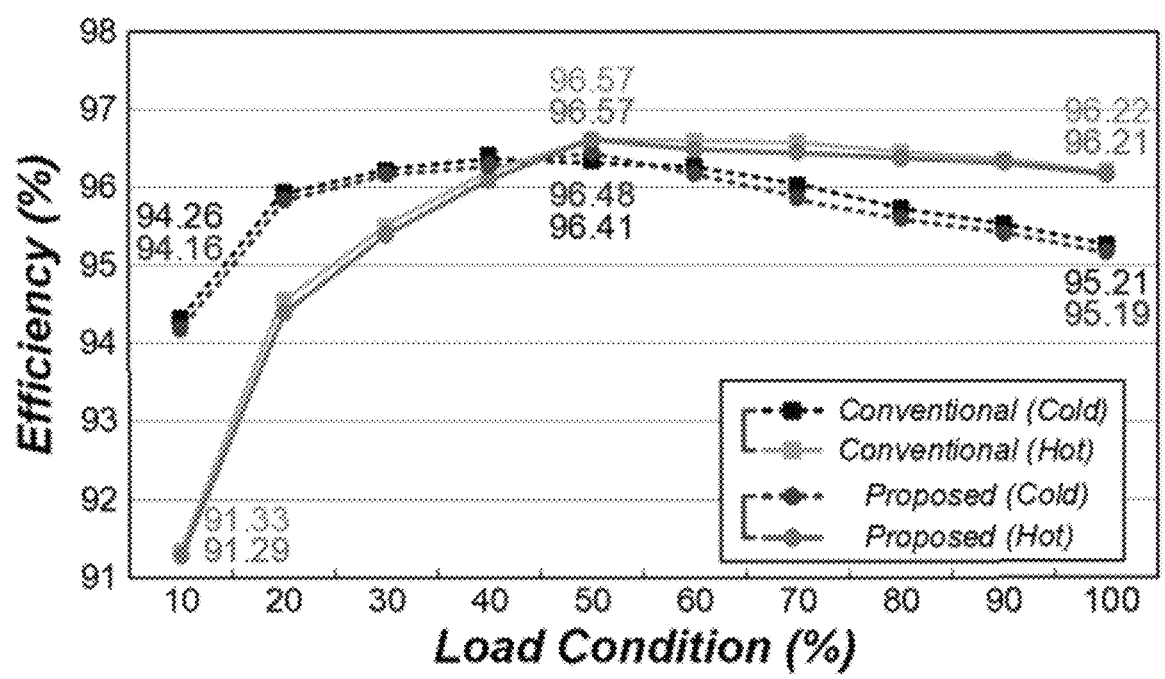

FIG. 12 illustrates efficiency measurement results of prototypes according to one embodiment of the present invention.

FIG. 12 represents the measured efficiency of the prototypes. Since input power and output load are connected to power analyzer WT1802E to measure the input power and output power, the efficiency may be calculated with high accuracy. The prototypes have the same characteristics, including voltage gain, operating frequency range, waveforms, etc. In addition, as shown in Table 3, the designed components are the same except for the resonant tank.

TABLE 3

|  | Conventional | Proposed |
|---|---|---|
| Primary switches | IPW60R099C6 (600 V, 99 mΩ) * 4/ 7.1 cm3, $32.56 | |
| Secondary diodes | VF30150C (150 V, 0.81 VF) * 4/ 3.2 cm3, $9.84 | |
| Transformer Conv: Lm, Prop: Lm1, Lm2 | E42/21/20 (50:13, Lm = 180 uH, Lm1 = Lm2 = 93 uH)/36.46 cm3, $2.5 | |
| Resonant inductor Conv: Lr, Prop: Lr1, Lr2 | E35/18/10 (26, Lr = 56.4 uH, Lr1 = Lr2 = 28.2 uH)/12.8 cm3, $1.36 | |
| Resonant capacitor Conv: Cr, Prop: Cr1, Cr2 | MPE Film cap * 4 (Cr = 40 nF)/ 1.76 cm3, $2.24 | MPE Film cap * 8 (Cr1 = Cr2 = 80 nF)/ 4.48 cm3, $5.04 |
| Number of converters | Three | Two |
| Total volume | 183.96 cm3 (61.32 cm3 × 3) | 128.08 cm3 (64.04 cm3 × 2) |
| Total cost | $145.5 ($48.5 × 3) | $102.6 ($51.3 × 2) |

Therefore, the proposed converter has almost the same efficiency as the conventional LLC converter.

Figure 13:
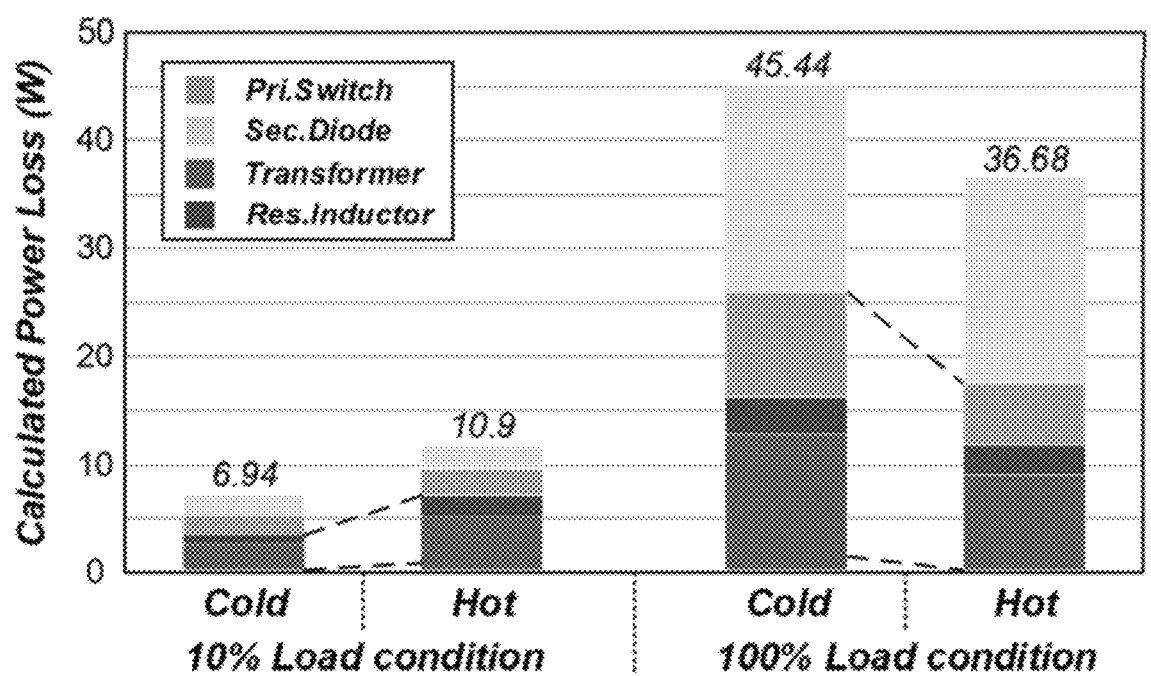

FIG. 13 illustrates loss analysis results of prototypes according to one embodiment of the present invention.

The loss analysis results of prototypes under 10% and 100% load conditions may be seen in FIG. 13. Under light load conditions, hot redundancy has less efficiency than cold redundancy because core loss in the transformer and resonant inductor increases. However, under overload conditions, hot redundancy has more efficiency than cold redundancy because conduction loss may be reduced by operating two LLC devices in parallel.

Figure 14:
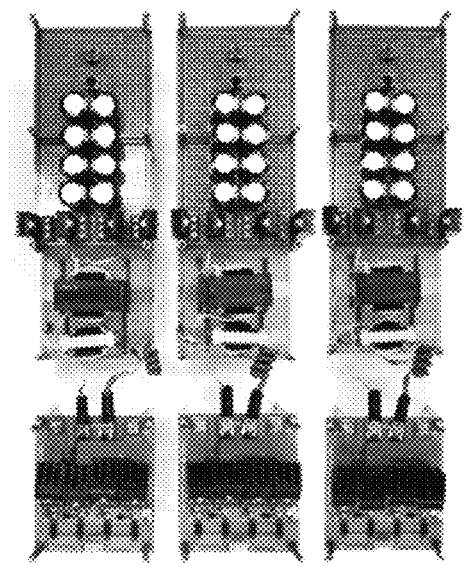
Figure 14:
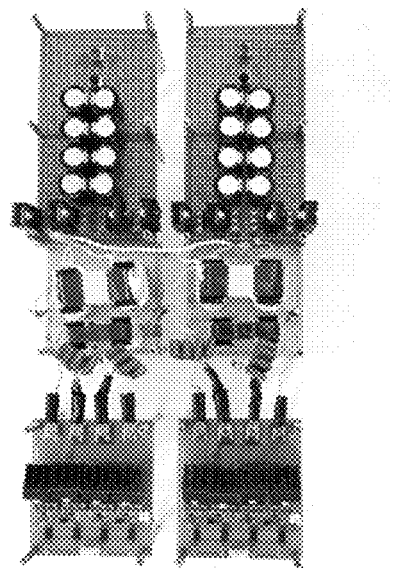

FIG. 14 illustrates pictures of prototypes according to one embodiment of the present invention.

'1+2' redundant converters may be used to withstand the double SCFs, as shown in FIG. 14(a). They may achieve high reliability, but the two redundant converters greatly degrade the power density and cost. The proposed converter may withstand double SCFs using only two converters instead of three converters. Thus, it may achieve high power density and low cost by removing one converter stage, as shown in FIG. 14(b).

Figure 15:
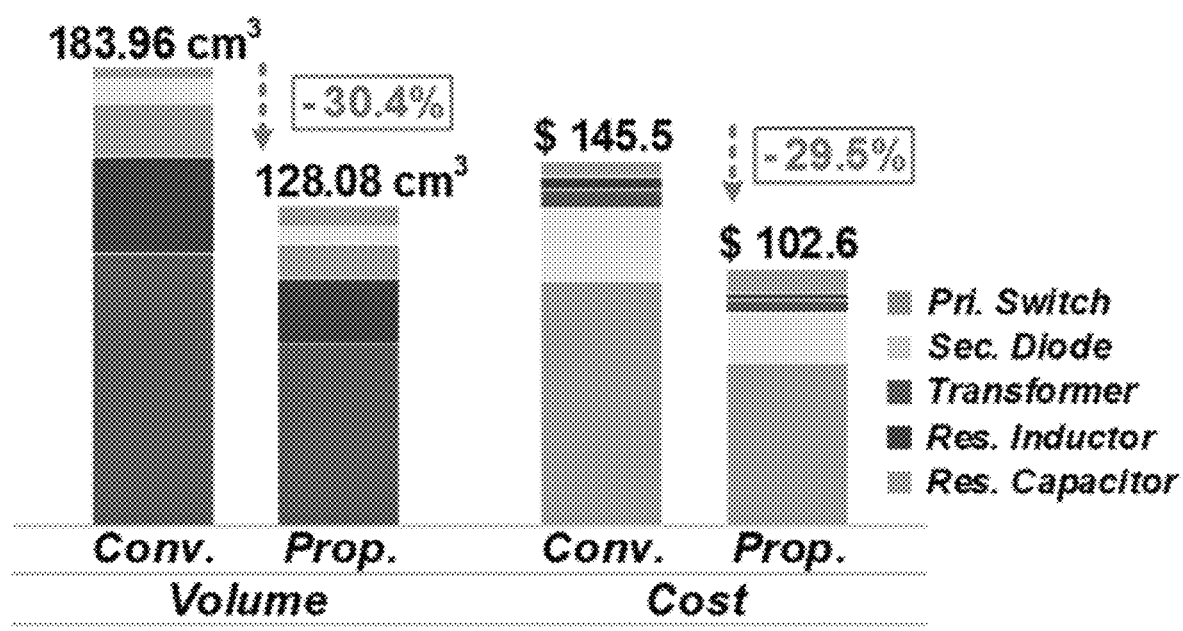

FIG. 15 illustrates volume and cost comparison of prototypes according to one embodiment of the present invention.

The proposed converter may reduce the volume by removing the transformer and resonant inductor, which occupy the largest volume in the converter. Therefore, the reduction in volume is 55.88 cm$^3$. The cost is also reduced by removing semiconductor components, such as switches and diodes.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A LLC resonant converter, comprising:
an original converter including a primary side circuit on which two half-bridge cells are connected in parallel and a secondary side circuit on which two half-bridge cells are connected in series; and
a redundant converter having the same configuration with the original converter, and connected with the original converter at a midpoint of a secondary winding,
wherein the primary side circuit of the original converter comprises:
a first half-bridge cell including two switches $Q_1$ and $Q_2$; and
a second half-bridge cell including two switches $Q_3$ and $Q_4$; and
a primary side circuit of the redundant converter comprises:
a first half-bridge cell including two switches $Q_5$ and $Q_6$; and
a second half-bridge cell including two switches $Q_7$ and $Q_8$,
wherein when the plurality of switches $Q_1$ to $Q_4$ of the original converter operate normally (Mode 1), the original converter controls an output voltage, and the redundant converter remains inactive,
wherein when operating in Mode 1,
a current of the original converter does not flow through the secondary winding of the redundant converter interconnected with the original converter, and the plurality of switches $Q_1$ to $Q_4$ of the original converter and a plurality of diodes $D_1$ to $D_4$ of the secondary side circuit of the original converter achieve a ZVS (Zero Voltage Switching), and
wherein the plurality of switches $Q_1$ to $Q_4$ are turned off by a trip area module of a digital MCU (Micro Controller Unit), and the digital MCU detects a position of a faulty switch by capturing a leg midpoint voltage triggered by a trip area signal.

2. The LLC resonant converter of claim 1, wherein from the primary side circuit of the original converter,
the two switches $Q_1$ and $Q_2$ have complementary duty cycles, and
the two switches $Q_3$ and $Q_4$ have complementary duty cycles, and
from the primary side circuit of the redundant converter,
the two switches $Q_5$ and $Q_6$ have complementary duty cycles, and
the two switches $Q_7$ and $Q_8$ have complementary duty cycles, and
a PFM (Pulse Frequency Modulation) control is used to regulate an output voltage.

3. The LLC resonant converter of claim 1, wherein when a single-fault occurs in one of the plurality of switches $Q_1$ to $Q_4$ of the original converter (Mode 2), the redundant converter is used to control an output voltage.

4. The LLC resonant converter of claim 3, wherein when operating in Mode 2,
gate drive signals of the plurality of switches $Q_1$ to $Q_4$ of the original converter are disabled, and the redundant converter operates.

5. The LLC resonant converter of claim 4, wherein when operating in Mode 2,
a current of the redundant converter does not flow through the secondary winding of the original converter interconnected with the redundant converter, and
the plurality of switches $Q_5$ to $Q_8$ of the redundant converter and a plurality of diodes $D_5$ to $D_8$ of the secondary side circuit of the redundant converter achieve a ZVS (Zero Voltage Switching).

6. The LLC resonant converter of claim 1, wherein when a double-fault in which a fault occurs in one of the plurality of switches $Q_1$ to $Q_4$ of the original converter, and at a same time a fault occurs in one of the plurality of switches $Q_5$ to $Q_8$ of the redundant converter occurs (Mode 3), the converter is reconfigured by utilizing the half-bridge cell which is normally operated among half-bridge cells of the original converter and the redundant converter.

7. A LLC resonant converter, comprising:
an original converter including a primary side circuit on which two half-bridge cells are connected in parallel and a secondary side circuit on which two half-bridge cells are connected in series; and
a redundant converter having the same configuration with the original converter, and connected with the original converter at a midpoint of a secondary winding,
wherein the primary side circuit of the original converter comprises:
a first half-bridge cell including two switches $Q_1$ and $Q_2$; and
a second half-bridge cell including two switches $Q_3$ and $Q_4$; and
a primary side circuit of the redundant converter comprises:
a first half-bridge cell including two switches $Q_5$ and $Q_6$; and
a second half-bridge cell including two switches $Q_7$ and $Q_8$,
wherein when a double-fault in which a fault occurs in one of the plurality of switches $Q_1$ to $Q_4$ of the original converter, and at a same time a fault occurs in one of the plurality of switches $Q_5$ to $Q_8$ of the redundant converter occurs (Mode 3), the converter is reconfigured by utilizing the half-bridge cell which is normally operated among half-bridge cells of the original converter and the redundant converter, and
wherein when operating in Mode 3,
the converter is reconfigured by utilizing a combination of the half-bridge cells which are normally operated among a first half-bridge cell and a second half-bridge cell of the primary side circuit of the original converter, a first half-bridge cell and a second half-bridge cell of the primary side circuit of the redundant converter, and
the converter limits a current spike by reducing an accumulation time of a current by increasing switching frequency by using a soft start-up method once a mode conversion begins.

8. The LLC resonant converter of claim 7, wherein the LLC resonant converter controls an output voltage by transferring a voltage to a corresponding transformer of the secondary side circuit of the original converter and the secondary side circuit of the redundant converter through a primary side transformer operating in the converter which is reconfigured with the combination of the half-bridge cells which are normally operated.

9. An operation method of a LLC resonant converter comprising an original converter including a primary side circuit on which two half-bridge cells are connected in parallel and a secondary side circuit on which two half-bridge cells are connected in series and a redundant converter having a same configuration with the original converter, and connected with the original converter at a midpoint of a secondary wingding, comprising:
controlling an output voltage by using the redundant converter when a single-fault occurs in one of a plurality of switches $Q_1$ to $Q_4$ of the original converter; and
reconfiguring a converter by utilizing the half-bridge cell which is normally operated among half-bridge cells of the original converter and the redundant converter when a double-fault that after the single-fault, a fault occurs in one of a plurality of switches $Q_5$ to $Q_8$ occurs,
wherein the primary side circuit of the original converter comprises:
a first half-bridge cell including two switches $Q_1$ and $Q_2$; and
a second half-bridge cell including two switches $Q_3$ and $Q_4$; and
a primary side circuit of the redundant converter comprises:
a first half-bridge cell including two switches $Q_5$ and $Q_6$; and
a second half-bridge cell including two switches $Q_7$ and $Q_8$,
wherein when the plurality of switches $Q_1$ to $Q_4$ of the original converter operate normally (Mode 1), the original converter controls an output voltage, and the redundant converter remains inactive,
wherein when operating in Mode 1,
a current of the original converter does not flow through the secondary winding of the redundant converter interconnected with the original converter, and the plurality of switches $Q_1$ to $Q_4$ of the original converter and a plurality of diodes $D_1$ to $D_4$ of the secondary side circuit of the original converter achieve a ZVS (Zero Voltage Switching), and
wherein the plurality of switches $Q_1$ to $Q_4$ are turned off by a trip area module of a digital MCU (Micro Controller Unit), and the digital MCU detects a position of a faulty switch by capturing a leg midpoint voltage triggered by a trip area signal.

10. The operation method of the LLC resonant converter of claim 9, wherein on the primary side circuit of the original converter, two switches $Q_1$ and $Q_2$ have complementary duty cycles, and two switches $Q_3$ and $Q_4$ have complementary duty cycles, and in the primary side circuit of the redundant converter, two switches $Q_5$ and $Q_6$ have complementary duty cycles, and two switches $Q_7$ and $Q_8$ have complementary duty cycles, and a PFM (Pulse Frequency Modulation) control is used to regulate an output voltage.

11. The operation method of the LLC resonant converter of claim 9, wherein when a single-fault occurs in one of the plurality of switches $Q_1$ to $Q_4$ of the original converter (Mode 2), the controlling an output voltage by using the redundant converter disables gate drive signals of the plurality of switches $Q_1$ to $Q_4$ of the original converter, and operates the redundant converter.

12. The operation method of the LLC resonant converter of claim 11, wherein when operating in Mode 2, a current of the redundant converter does not flow through the secondary winding of the original converter interconnected with the redundant converter, and the plurality of switches $Q_5$ to $Q_8$ of the redundant converter and a plurality of diodes $D_5$ to $D_8$ of the secondary side circuit of the redundant converter achieve a ZVS (Zero Voltage Switching).

13. The operation method of the LLC resonant converter of claim 9, wherein when a double-fault that after the single-fault, a fault occurs in one of a plurality of switches $Q_5$ to $Q_8$ of the redundant converter occurs (Mode 3), the reconfiguring a converter by utilizing the half-bridge cell which is normally operated among the half-bridge cells of the original converter and the redundant converter, wherein primary side circuit of the original converter comprises a first half-bridge cell including two switches $Q_1$ and $Q_2$ and a second half-bridge cell including two switches $Q_3$ and $Q_4$, and primary side circuit of the redundant converter including a first half-bridge cell including two switches $Q_5$ and $Q_6$ and a second half-bridge cell including two switches $Q_7$ and $Q_8$, reconfigures the converter by utilizing combination of the half-bridge cells which are normally operated among the first half-bridge cell and the second half-bridge cell of the primary side circuit of the original converter, the first half-bridge cell and the second half-bridge cell of the primary side circuit of the redundant converter.

14. The operation method of the LLC resonant converter of claim 13, wherein the LLC resonant converter controls an output voltage by transferring voltage to corresponding transformer of the secondary side circuit of the original converter and the secondary side circuit of the redundant converter through a primary side transformer operating in the converter which is reconfigured with the combination of the half-bridge cells which are normally operated.

\* \* \* \* \*